(12) United States Patent
Hou

(10) Patent No.: US 9,329,064 B2
(45) Date of Patent: May 3, 2016

(54) FLOW METER REGULATION VALVE FASTENING STRUCTURE

(71) Applicant: Yao-Sung Hou, Kaohsiung (TW)

(72) Inventor: Yao-Sung Hou, Kaohsiung (TW)

( * ) Notice: Subject to any disclaimer, the term of this patent is extended or adjusted under 35 U.S.C. 154(b) by 455 days.

(21) Appl. No.: 13/671,332

(22) Filed: Nov. 7, 2012

(65) Prior Publication Data

US 2014/0123752 A1      May 8, 2014

(51) Int. Cl.
| | |
|---|---|
| *G01F 1/00* | (2006.01) |
| *G01F 1/22* | (2006.01) |
| *G01F 15/00* | (2006.01) |
| *G01F 15/14* | (2006.01) |

(52) U.S. Cl.
CPC ............... *G01F 1/22* (2013.01); *G01F 15/005* (2013.01); *G01F 15/14* (2013.01)

(58) Field of Classification Search
CPC ........................................................ G01F 1/00
USPC ........................................................... 73/199
See application file for complete search history.

(56) References Cited

U.S. PATENT DOCUMENTS 7,980,127 B1    7/2011  Hou

OTHER PUBLICATIONS

Roymech, "Screw Locking and Retaining Methods", http://www.roymech.co.uk/Useful_Tables/Screws/Locking.html, Accessed Oct. 29, 2004.*

* cited by examiner

*Primary Examiner* — Robert R Raevis
(74) *Attorney, Agent, or Firm* — Muncy, Geissler, Olds & Lowe PC

(57) ABSTRACT

A flow meter regulation valve fastening structure includes a holder with one side coupled with a regulation valve by screwing. The regulation valve has a regulation shaft with a flange and a screw head located at an upper side. The screw head is coupled with an anchor member. The anchor member has a coupling plate at one end coupled on the screw head and an anchor plate at another end with two detent plates extended downwards from two sides to butt two sides of the frame edge of the holder for retaining. Thereby when the regulation valve is coupled with the holder and a pipe, the junction of the regulation valve and the holder can be prevented from generating fractures due to excessive turning forces.

2 Claims, 6 Drawing Sheets

FLOW METER REGULATION VALVE FASTENING STRUCTURE

FIELD OF THE INVENTION

The present invention relates to a flow meter regulation valve fastening structure and particularly to a structure to prevent junction of a holder of a flow meter and a regulation valve from generating fractures when the regulation valve is coupled with the holder and a pipe.

BACKGROUND OF THE INVENTION

The Applicant has proposed an improved flow meter in U.S. Pat. No. 7,980,127 as shown in FIGS. 1, 2 and 3, which includes a transparent holder 10 with a frame edge 11 formed at one side. The frame edge 11 has a first screw hole 12 at one end communicating with the interior of the flow meter 1 and screwing with a regulation valve 13. The regulation valve 13 has an external thread portion 131 at one end to screw with the first screw hole 12, a fastening screw hole 132 inside the same end, and an adjustment knob 133 at another end. The first screw hole 12 is connected to a first fastening portion 122 via a first connection rib 121. The frame edge 11 also has a second screw hole 14 at another end communicating with the interior of the flow meter 1. The second screw hole 14 is connected to two second fastening portions 142 respectively via a second connection rib 141. After the flow meter 1 has been coupled with the regulation valve 13 via the regulation valve 13 screwing with the first screw hole 12, they are handed over to the factories. In the factory, the operator couples the regulation valve 13 with a pipe through the fastening screw hole 132, but the flow meter 1 thus formed has deficiency to be mended, notably:

The transparent holder 10 is made of acrylic. As the second screw hole 14 is connected to two second fastening portions 142 via two second connection ribs 141, and the first screw hole 12 is only connected to one first fastening portion 122 via one first connection rib 121, two sides of the second screw hole 14 are stronger in structure than that of the first screw hole 12. When the operator fastens the pipe to the fastening screw hole 132 of the regulation valve 13 (i.e. the flow meter 1) by excessive turning forces, the outer side around the first screw hole 12 is easily to be damaged to generate a fracture 101 (referring to FIG. 3). This could impact the fastening structure of the regulation valve 13 in the transparent holder 10. As a result, the lifespan of the flow meter 1 is reduced and an extra cost incurs to the manufacturer.

SUMMARY OF THE INVENTION

The primary object of the present invention is to provide a flow meter regulation valve fastening structure to prevent junction of a holder of a flow meter and a regulation valve from generating fractures when the regulation valve is coupled with the holder and a pipe.

To achieve the foregoing object, the flow meter regulation valve fastening structure of the invention includes a holder with one side coupled with a regulation valve by screwing. The regulation valve has a regulation shaft with a flange and a screw head at an upper side. The screw head has a pipe connection screw hole inside and is coupled by an anchor member. The anchor member has a coupling plate at one end to couple on the screw head and an anchor plate at another end with two detent plates extended downwards from two sides to butt two sides of the frame edge of the holder for retaining. Thereby when the regulation valve is coupled with the holder and a pipe, the junction of the regulation valve and the holder can be prevented from generating fractures.

By means of the fastening structure set forth above, the invention can achieve many advantages, notably:

During assembly of the flow meter, the anchor member is coupled on the regulation valve with the coupling plate coupled on the screw head at the upper side of the regulation shaft. The two detent plates extended downwards from two sides of the anchor plate at another end of the anchor member also butt two sides of the frame edge of the holder for retaining. Therefore, when the regulation valve is coupled with the holder and the pipe, the junction of the regulation valve and the holder can be prevented from generating fractures due to excessive turning forces.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
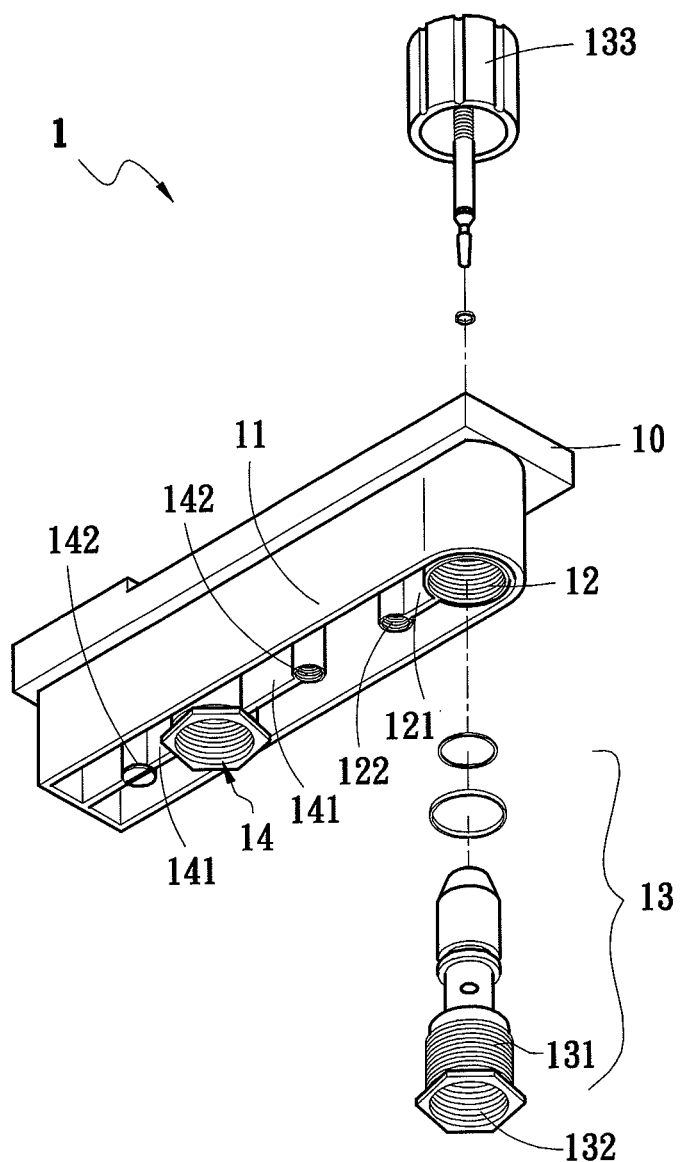
FIG. 1 is a bottom exploded view of a flow meter disclosed in U.S. Pat. No. 7,980,127.
Figure 2:
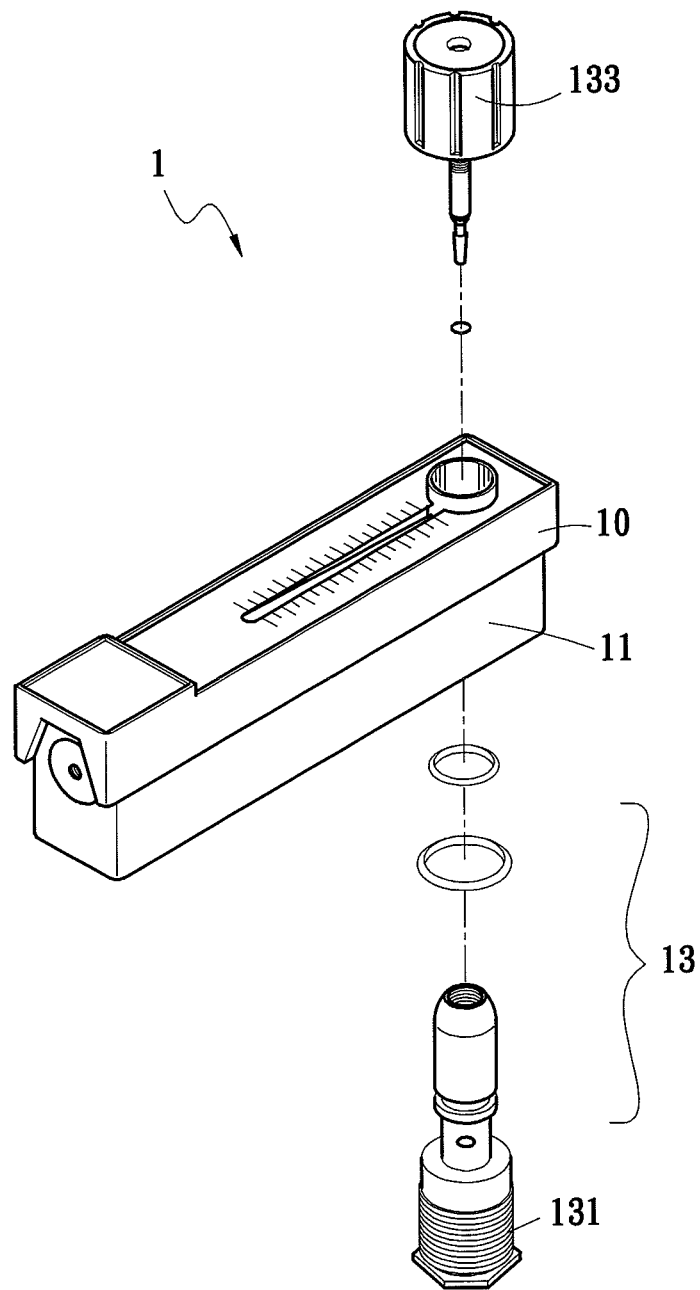
FIG. 2 is a front exploded view of the flow meter according to FIG. 1.
Figure 3:
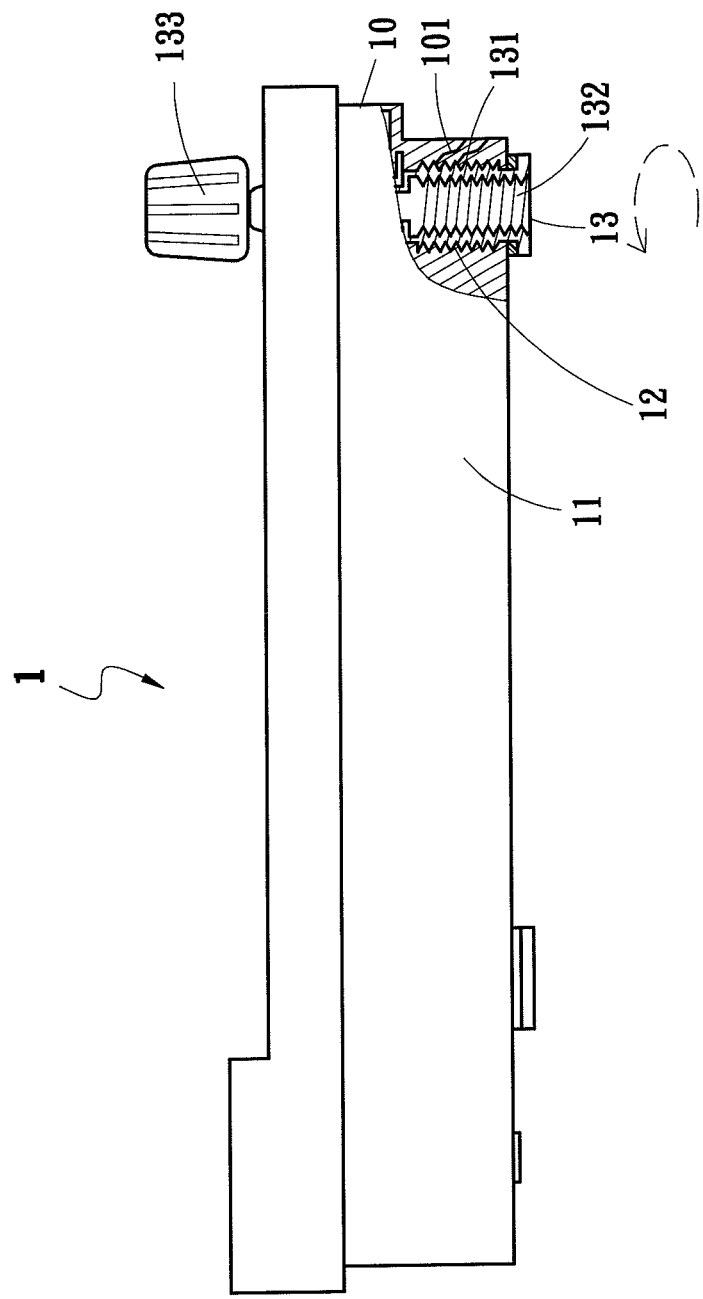
FIG. 3 is a sectional view of the flow meter according to FIG. 1 in an assembled condition.
Figure 4:
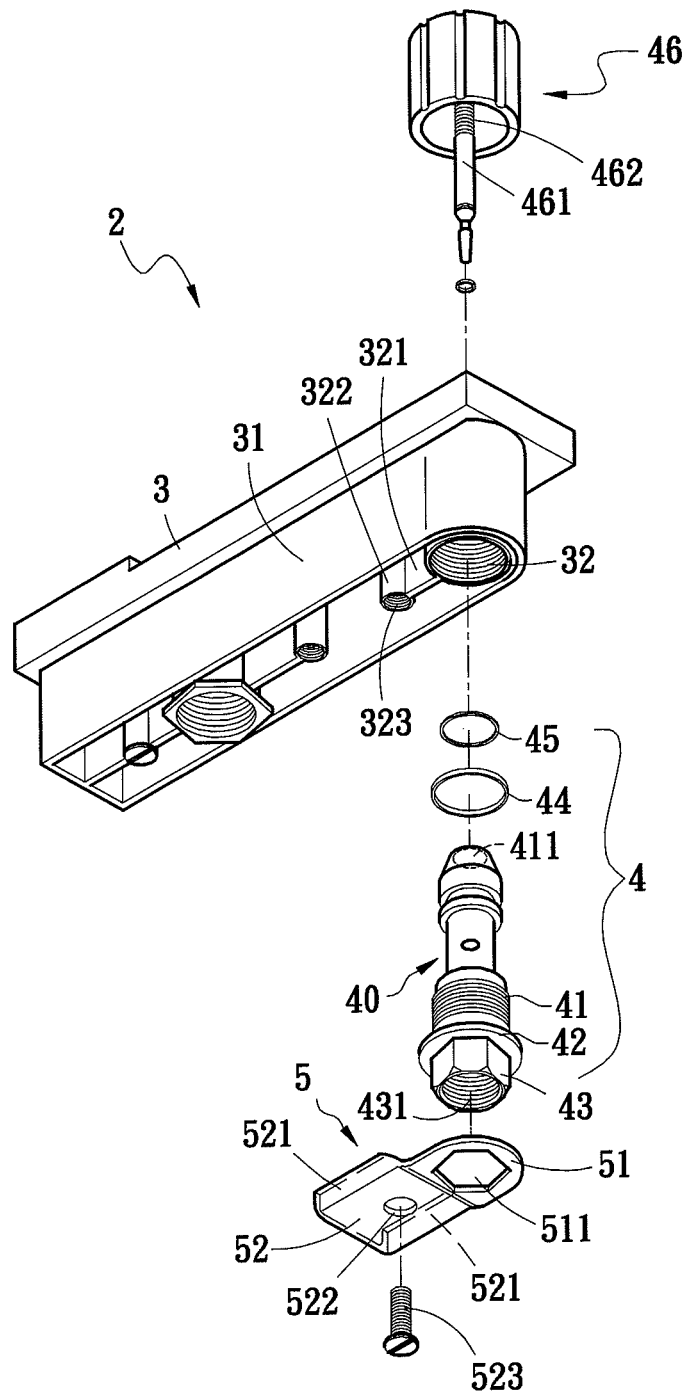
FIG. 4 is a bottom exploded view of a flow meter according to the invention.
Figure 5:
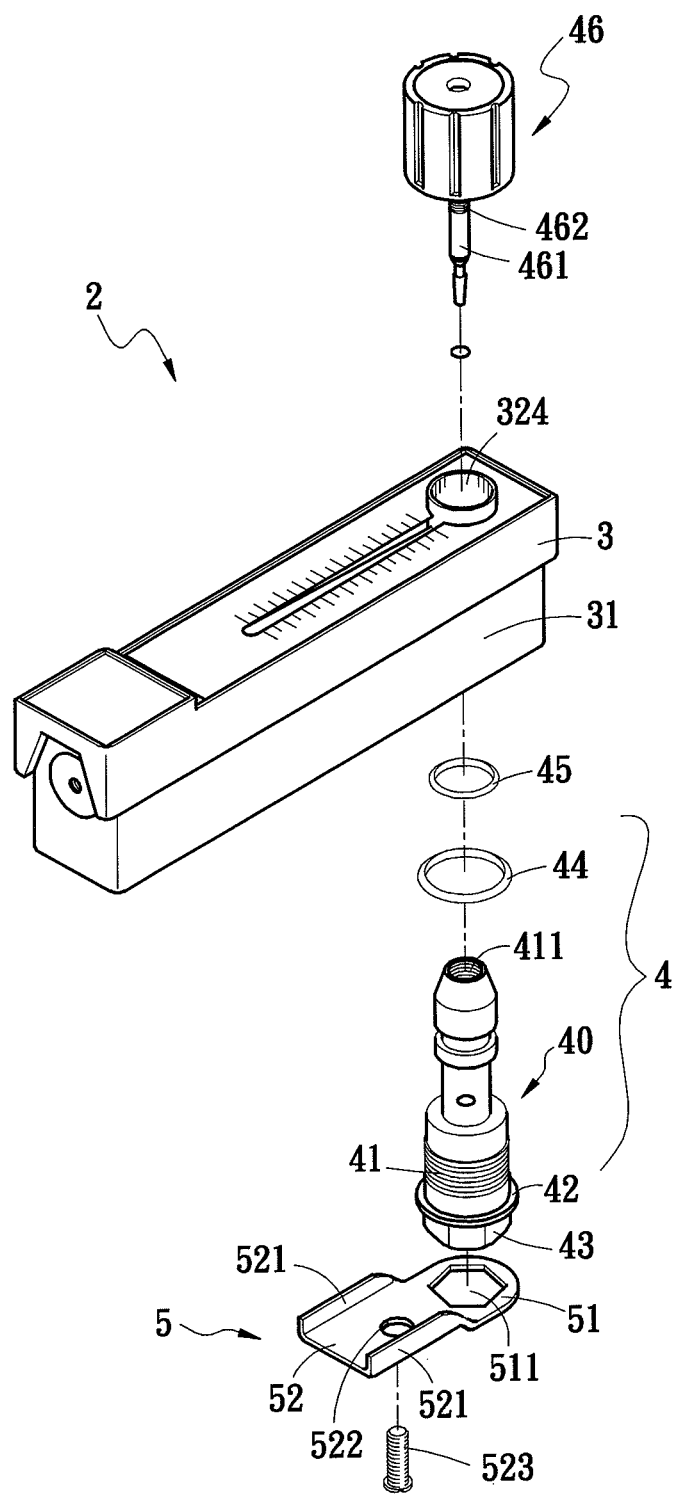
FIG. 5 is a front exploded view of the flow meter according to FIG. 4.
Figure 6:
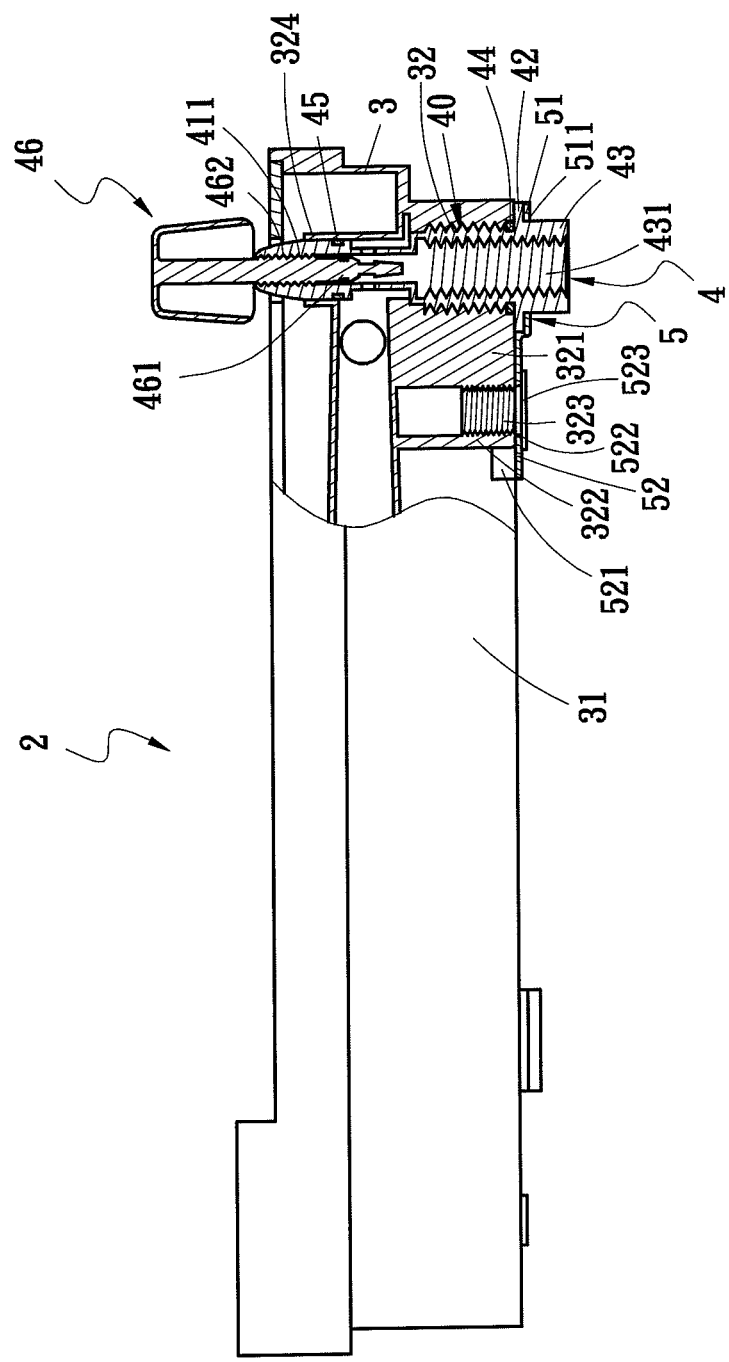
FIG. 6 is a sectional view of the flow meter according to FIG. 4 in an assembled condition.

Please refer to FIGS. 4, 5 and 6, the present invention aims to provide a flow meter regulation valve fastening structure in which the flow meter 2 has a holder 3 with a frame edge 31 formed at one side. The frame edge 31 has a screw hole 32 at one end communicating with the interior of the flow meter 2 to couple with a regulation valve 4 by screwing. The screw hole 32 is connected to a fastening portion 322 via a connection rib 321. The fastening portion 322 has a fastening hole 323. The holder 3 also has a through hole 324 communicating with the fastening hole 32.

The regulation valve 4 includes a regulation shaft 40 and an adjustment knob 46 fastened to the regulation shaft 40. The regulation shaft 40 has an external thread portion 41 at an upper end to screw with the screw hole 32, a flange 42 at the upper side, and a screw head 43 located on the flange 42. In this embodiment, the screw head 43 is formed in a hexagonal shape and includes a pipe connection screw hole 431 inside to screw with a selected liquid pipe (not shown in the drawings). The regulation valve 4 also has a holding bore 411 at a lower side to hold a stem 461 extended from the inner side of the adjustment knob 46 and an external screw bar 462 located close to the upper side of the stem 461. Through turning the adjustment knob 46 to control the stem 461 on the regulation valve 4, the amount of liquid can be regulated. The regulation valve 4 further has a first ring 44 and a second ring 45. After the external thread portion 41 of the regulation valve 4 is screwed with the screw hole 32 of the holder 3, the first ring 44 and the second ring 45 can enhance sealing between the regulation valve 4 and the holder 3.

The fastening structure of the invention further includes an anchor member 5 which has a coupling plate 51 at one end with a coupling hole 511 formed thereon to couple with the screw head 43 so that the screw head 43 can tightly butt the upper side of the flange 42. In this embodiment, the coupling hole 511 also is formed in a hexagonal shape to match the screw head 43 so that the coupling plate 51 can be coupled on the screw head 43 without turning. The anchor member 5 also has an anchor plate 52 at another end with two detent plates 521 extended downwards from two sides thereof to butt two sides of the frame edge 31 for retaining. The anchor plate 52 has an aperture 522 corresponding to the fastening hole 323. A screw 523 runs through a targeted object for fastening first, and then the screw 523 runs through the aperture 522 to fasten to the fastening hole 323. Thus through the anchor member 5, junction of the holder 3 and regulation valve 4 can be avoided from fracturing while the regulation valve 4 is coupled with the holder 3 and the pipe.

Please refer to FIG. 6, the flow meter 2 is assembled by fastening the external thread portion 41 of the regulation valve 4 to the screw hole 32 of the holder 3 and then handed over to the factories. In the factory, an operator fastens the pipe connection screw hole 431 of the regulation shaft 40 to the pipe by screwing, in which the coupling hole 511 of the coupling plate 51 at one end of the anchor member 5 is coupled on the screw head 43 while the two detent plates 521 that are extended downwards from two sides of the anchor plate 52 at another end of the anchor member 5 butt two sides of the frame edge 31 to prevent the anchor member 5 from turning. Next, the screw 523 first runs through the targeted object for fastening, and then runs through the aperture 522 of the anchor plate 52 to fasten to the fastening hole 323, thereby the junction of the holder 3 and regulation valve 4 can be avoided from fracturing caused by excessive turning forces when the regulation valve 4 is coupled with the holder 3 and the pipe.

What is claimed is:

1. A flow meter regulation valve fastening structure, comprising:
   a flow meter including a holder with a frame edge formed at one side, the frame edge including a screw hole at one end communicating with interior of the flow meter, the screw hole connecting to a fastening portion via a connecting rib, the fastening portion including a fastening hole;
   a regulation valve including a regulation shaft screwed with the screw hole and an adjustment knob coupled with the regulation shaft, the regulation shaft including an external thread portion screwing with the screw hole, a flange formed at an upper side of the external thread portion and a screw head located on the flange, the screw head including a pipe connection screw hole; and
   an anchor member which is coupled on the screw head and includes a coupling plate at one end with a coupling hole to couple with the screw head to abut against an upper side of the flange and an anchor plate at another end with two detent plates extended downwards from two sides to butt two sides of the frame edge without moving, wherein the anchor plate includes an aperture corresponding to the fastening hole of the fastening portion and allowing a screw to run through the aperture and the fastening hole in order.

2. The flow meter regulation valve fastening structure of claim 1, wherein the screw head of the regulation shaft is formed in a hexagonal shape, and the coupling hole of the coupling plate is also formed in a hexagonal shape to couple with the screw head.

\* \* \* \* \*